(12) United States Patent
Haase et al.

(10) Patent No.: US 10,760,968 B2
(45) Date of Patent: Sep. 1, 2020

(54) SPECTROMETRIC MEASURING DEVICE

(71) Applicant: Endress+Hauser Conducta GmbH+Co. KG, Gerlingen (DE)

(72) Inventors: Björn Haase, Stuttgart (DE); Joachim Bolle, Stockach (DE)

(73) Assignee: Endress+Hauser Conducta GMBH+C. KG, Gerlingen (DE)

( * ) Notice: Subject to any disclaimer, the term of this patent is extended or adjusted under 35 U.S.C. 154(b) by 0 days.

(21) Appl. No.: 16/192,244

(22) Filed: Nov. 15, 2018

(65) Prior Publication Data

US 2019/0154505 A1  May 23, 2019

(30) Foreign Application Priority Data

Nov. 17, 2017 (DE) .......... 10 2017 127 122

(51) Int. Cl.
| | |
|---|---|
| *G01J 3/40* | (2006.01) |
| *G01J 3/42* | (2006.01) |
| *G01J 3/18* | (2006.01) |
| *G01J 3/28* | (2006.01) |
| *G01J 3/02* | (2006.01) |
| *G01J 3/08* | (2006.01) |

(52) U.S. Cl.
CPC ............ *G01J 3/42* (2013.01); *G01J 3/0208* (2013.01); *G01J 3/0213* (2013.01); *G01J 3/0229* (2013.01); *G01J 3/08* (2013.01); *G01J 3/18* (2013.01); *G01J 3/2823* (2013.01)

(58) Field of Classification Search
CPC .......... G01J 3/42; G01J 3/0205; G01J 3/0208; G01J 3/0213; G01J 3/18; G01J 3/2823

USPC ....................................................... 356/305
See application file for complete search history.

(56) References Cited

U.S. PATENT DOCUMENTS

| | | | | |
|---|---|---|---|---|
| 4,973,159 A | * | 11/1990 | Sohma | G01J 3/2823 356/315 |
| 5,210,590 A | | 5/1993 | Landa et al. | |
| 6,813,019 B2 | * | 11/2004 | Hammer | G01J 3/02 356/326 |
| 2011/0285993 A1 | * | 11/2011 | Becker-Ross | G01J 3/02 356/305 |

(Continued)

FOREIGN PATENT DOCUMENTS

| | | |
|---|---|---|
| DE | 4230298 A1 | 3/1994 |
| DE | 10207742 A1 | 9/2003 |
| DE | 102007020945 A1 | 12/2007 |

*Primary Examiner* — Tarifur R Chowdhury
*Assistant Examiner* — Jonathon Cook
(74) *Attorney, Agent, or Firm* — Kelly J. Smith; PatServe (57) ABSTRACT

The present disclosure includes a spectrometric measuring device for a measurement point of the process automation system, including a broadband light source for radiating light through an entrance aperture onto a sample to be measured, wherein the beam bundles of the light form an irradiation plane, a light limiter that limits the light at an angle to the irradiation plane, whereby a different amount of light results at this angle. The device further includes a dispersive element for separating the light according to its wavelength and a detector for receiving light separated according to its wavelength, wherein the light source beams the light through the sample to the entrance aperture, the light limiter and the dispersive element, and the light strikes the detector.

19 Claims, 6 Drawing Sheets

(56) References Cited

U.S. PATENT DOCUMENTS

2011/0299075 A1* 12/2011 Meade ..................... G01J 3/02
356/326
2012/0188542 A1* 7/2012 Demmer ............... G01J 3/0291
356/328

* cited by examiner

SPECTROMETRIC MEASURING DEVICE

CROSS-REFERENCE TO RELATED APPLICATION

The present application is related to and claims the priority benefit of German Patent Application No. 10 2017 127 122.8, filed on Nov. 17, 2017, the entire contents of which are incorporated herein by reference.

TECHNICAL FIELD

The present disclosure to a spectrometric measuring device for a measurement point of the process automation system.

BACKGROUND

In production processes, spectrometric measurements may be performed in gases, liquids, solids, and multiphase mixtures to obtain findings about the production process or a substance formed as a product of the process, in particular, its quantity or quality. From spectrometric measurements, values of measurands correlating to the concentration of educts and/or auxiliary materials of the process can be obtained. For example, in a biochemical production process, concentrations of nutrients and/or concentrations of metabolites of the microorganisms used in the production process and/or the concentration of the product produced in the process in a process medium may be monitored and the process controlled and/or regulated with the aid of the measurement data thus obtained. The process medium is generally contained in a process container, such as a reactor, a fermenter, or in a duct.

In absorption spectroscopy, a broadband light source is generally used, the light of which is directed through the medium to be investigated by using transparent windows or cuvettes, for example, and then analyzed in an optical spectrometer. The spectrometer thereby includes a detection unit comprising an aperture (for example, a slit), an imaging system and a detector, as well as the light source previously mentioned and the corresponding beam path.

The substances and mixtures of substances present in the medium may be identified by means of their characteristic absorption lines. Depending upon the molecule spectrum, different wavelengths are thereby of interest. Important here is that not only is the identification of individual lines relevant, but also their absolute signal strength, since information relating to the respective concentration may be calculated therefrom. In particular, many substances that are significant for applications of the process automation system have absorption lines in the ultraviolet (UV) spectral range. Therefore, for the analysis of such a mixture of substances, a UV absorption spectrometer requires, in particular, a detector designed for the wavelength range and an associated, appropriate light source.

Essentially, a distinction can be made between LED's, thermal lamps (e.g., halogen lamps), and gas discharge lamps.

Halogen lamps are ideal for spectrometric absorption measurements in a wide frequency range. They have a quite steady emission spectrum and emit continuous light. However, due to the practically temperatures of the lamp's filament, hardly any signal components are possible in the ultraviolet spectral range. Particularly in the shortwave light range below 350 nm, there is hardly any light intensity present. It is characteristic for gas discharge lamps that the relative light intensities through the resonances of the light sources do not form a continuous spectrum but, instead, sharply defined areas of high amplitude and areas with very low signal strength. This property is a key challenge for quantitative absorption measurements in particular, as it requires a detector with an extraordinarily high signal dynamic for a stable measurement.

A broadening of the sharp spectral lines, with gas discharge lamps, may, for example, be achieved in that the illuminating gas is brought under extremely high pressure and is operated at very high temperatures, as is the case, for example, with so-called xenon high-pressure lamps. The frequent nuclear shocks in the lighting medium caused by the high pressure result in a disruption of the quantum-mechanical transitions and a broadening of the sharp spectral lines. These types of high-pressure lamps often require an explosion-proof housing and separate cooling systems, which means that they are only employed in industrial sensors in exceptional cases. Therefore, it is necessary in practice to take appropriate steps to be able to perform absorption measurements in all frequency ranges despite the high signal dynamics, i.e., a lot of signal on the resonances and little signal in between.

In addition, in contrast to more or less continuously illuminating light sources for the visible spectral range, as are also used for ceiling lighting, considerably higher excitation energies are required for UV light sources. These may, for example, be achieved for gas discharge lamps that are controlled in individual flashes of high energy. These lamps can typically only be operated with very low repetition rates (e.g., 10 Hz) over long operating periods of several years.

As a final variant, UV LED's are also used as a light source. In contrast to the aforementioned lamps, however, these lamps have only an extraordinarily narrow frequency spectrum and for this reason are not suitable for a broadband analysis of the absorption characteristics for many wavelengths.

In summary, it can be noted that, for the majority of practical applications of industrial UV spectroscopy, only UV gas discharge lamps controlled with single flashes can be considered, and that, in practice, said lamps have in their emission spectrum a large number of sharp lines with strong intensity and, simultaneously, wavelength ranges in between with hardly any emitted light.

Today, cost-effective spectrometric detectors are usually constructed on a silicon basis and have, in particular, a characteristic wavelength-dependent sensitivity. This, in addition, increases the dynamic range necessary for broadband absorption in the detector.

In particular, CCD and CMOS detectors may be used for spectrometers. CMOS sensors have a high dynamic range that is actually desirable; however, they often do not have an optimal linearity property, which is particularly important for absorption measurements. With absorption measurements, the intensity of the measured transmitted spectrum is generally divided by the intensity of a reference measurement. That is, for example, a measurement for which the amount of light resulting when a sample liquid is filled into an irradiated liquid cuvette is divided by the intensities of a measurement for which pure water is poured into the transmission cuvette. Depending upon the absorption rate and wavelength, considerable differences in intensity can result in these two measurements. Particularly with high dynamic ranges, CMOS detectors often do not achieve any reliable quantitative results, particularly not if the temperature changes.

By contrast, CCD sensors usually have excellent linearity, but often have only a sharply reduced dynamic range. Usually, high-linearity CCD sensors are used, particularly for absolute transmission measurements. When continuously illuminating light sources are used, a very high dynamic range may be achieved as a result of the exposure time on the CCD detector being shortened or lengthened. However, this method is ruled out when UV flash lamps are used, since the typical flash pulse durations of 1 ns or less are considerably smaller than the minimum adjustable exposure times of CCD detectors, and an exposure with more than one flash pulse is not usually possible due to the only low flash pulse repetition rate possible.

SUMMARY

The problem underlying the present disclosure is to provide a spectrometer, for example, as part of a UV absorption spectrometer, that works with high linearity and has a high dynamic range.

The present disclosure includes a spectrometric measuring device comprising: a broadband light source for radiating light through an entrance aperture onto a sample to be measured, wherein the light bundles, for example, inside the spectrometer, form an irradiation plane; an asymmetrical light limiter, also referred to herein as a spatial filter, which limits the light at an angle, for example, 90°, to the irradiation plane, whereby a different amount of light results at this angle; a dispersive element for separating the light according to its wavelength; and a detector for receiving light separated according to its wavelength, wherein the light source beams the light through the sample to the entrance aperture, the light limiter, and the dispersive element, and the light strikes the detector, wherein the detector is designed as a two-dimensional detector and is oriented such that light can be received at the angle, for example, 90°. This results in a high dynamic, and a high linearity may be achieved.

In one embodiment, the light in the absorption spectrometer, i.e., in the spectrometric measuring device, follows the path from the light source via the sample into the spectrometer and, there, into the entrance aperture, the light limiter, and the dispersive element towards the detector. In one embodiment, the order of the specified components is changed.

In one embodiment, an optical system for parallelizing (collimating) the light from the light source is arranged between light source and sample. This is done using collimation optics. Therefore, parallel light essentially shines through the sample. The optical system comprises one or more lenses, a lens system, or a fiber optic cable.

In one embodiment, between sample and entrance aperture, an optical system is arranged which directs or conducts the light through the entrance aperture. The optical system comprises one or more lenses, mirrors, beam splitters, a lens system, or a fiber optic cable.

In one embodiment, the light limiter has an asymmetrical design. In one embodiment, the light limiter has a different width or thickness, at least along its longest edge.

In one embodiment, the entrance aperture comprises the light limiter.

In one embodiment, the light limiter is conical.

In one embodiment, the light limiter is designed continuously along the angle. In other words, the light along the angle is continuously limited.

In one embodiment, the light limiter is step-like.

In one embodiment, the light limiter is arranged between light source and dispersive element. In one embodiment, the shadow cast by the light limiter on the detector does not form a sharp structure, but, rather, a blurred, sliding shadow.

In one embodiment, the spectrometer comprises at least one imaging system for conducting the light from the light source in the direction of the dispersive element and/or from the dispersive element in the direction of the detector.

In one embodiment, the imaging system comprises a concave mirror.

In one embodiment, the dispersive element comprises an optical grating.

In one embodiment, the light limiter is arranged between light source and an imaging system, wherein the imaging system conducts the light from the light source to the dispersive element.

In one embodiment, the light limiter is arranged between dispersive element and an imaging system, wherein the imaging system conducts the light from the light source to the detector.

In one embodiment, the light limiter is arranged between an imaging system and a detector, wherein the imaging system conducts the light from the light source to the detector.

In one embodiment, the light limiter is designed as a diaphragm.

In one embodiment, the diaphragm has a comb-like design.

In one embodiment, the asymmetric light limiter is designed such that the light at the angle, for example, 90°, to the irradiation plane (x-y) is limited such that, at this angle, a different amount of light continuously results.

In one embodiment, the spectrometric measuring device, for example, the absorption spectrometer, comprises a measurement path (measurement light) and a reference path (reference light), wherein light from the light source can be conducted via the measurement path and the reference path, wherein the reference path goes past the sample.

For precise absorption measurements, different interfering signal sources should be able to be examined independently of one another. As sources of interference, the aging of the lamp, in particular, is also considered. For this reason, the spectrum of the light source is measured independently, wherein light is conducted via the reference path around the sample to be investigated. In one embodiment, light is coupled to a fiber optic cable upstream of the sample and decoupled again upstream of the entrance aperture.

In one embodiment, light is radiated through either the reference path or the measurement path, i.e., through the sample to be investigated, via pivotable diaphragms. Pivotable, movable diaphragms can be moved, for instance, via an electric motor.

In one embodiment, in the absorption spectrometer, the coupling of the light of the reference path into the spectrometer ensues via a spatially separated area of the light limiter, so that a spatial separation of reference light and measurement light also ensues on the two-dimensional detector. In this embodiment, reference light and measurement light are received simultaneously with one single detection of the two-dimensional intensity spectrum.

With respect to gas discharge flash lamps operated in pulse mode, this embodiment can offer the advantage that pulse-to-pulse intensity fluctuations of the light source may be compensated for by the fact that reference light and measurement signal of the pulse may always be detected simultaneously. For example, if the amount of light of a flash fluctuates from pulse-to-pulse by 10%, this fluctuation can be identified in the reference light range spatially separated on the 2-D detector and compensated for mathematically, for example, by dividing the measured measurement light intensities by the measured reference light intensities.

When mechanical "shutters" are used (realized, for example, by means of electric motors), only alternatively, either the reference path or the measurement path can be detected for the respective light flash, and, with intensity fluctuations of the light source, significantly more measuring time is required for averaging than if the fluctuation of the intensity of the individual pulses can always be directly detected via the reference path.

In relation to the intensity of the measurement signals and the dynamic range thereby necessary for the measurement in the detector, it is significant that, in general, the reference path and the light conducted through the sample to be investigated can have different amplitudes, e.g., as a result of the fact that considerable intensity losses may have to be considered in the windows of a transparent cuvette used for the irradiation of a medium.

In one embodiment, the detector is tilted with respect to the x-z-axis, for example, with respect to the x-axis.

BRIEF DESCRIPTION OF THE DRAWINGS

The present disclosure is explained in more detail with reference to the following figures, which include.

In the figures, the same features are identified with the same reference symbols. In the following, the "right-left" axis shall be designated as the x-axis, the "top-bottom" axis as the y-axis, and the axis from the plane as the z-axis.

DETAILED DESCRIPTION

Figures 1, 2:
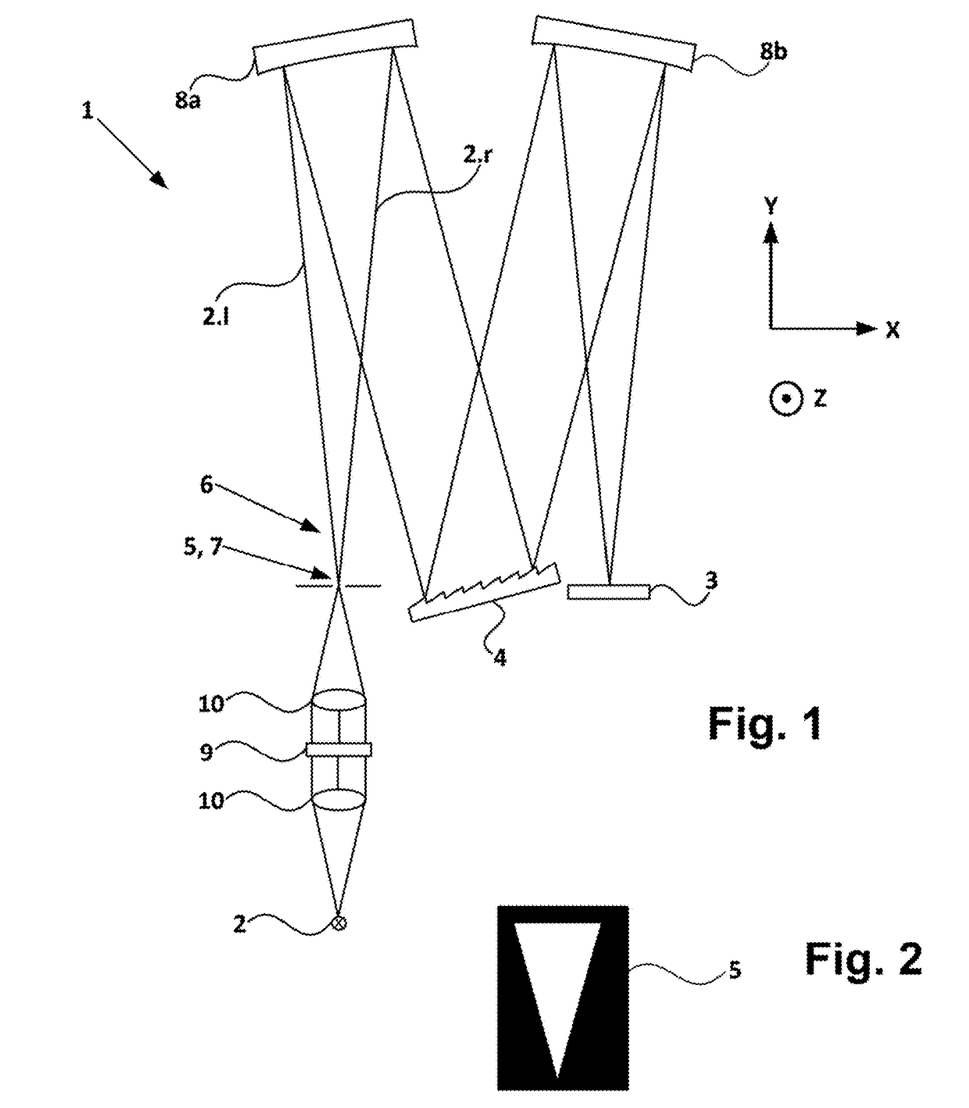
FIG. 1 shows a optical absorption spectrometer, according to the present disclosure.
FIG. 2 shows an embodiment of a light limiter.

A spectrometric measurement system according to the present disclosure is mark identified with the reference symbol 1 and is shown in FIG. 1.

The spectrometer 1 may be an absorption spectrometer including a broadband light source 2, e.g., a pulsed flash lamp, a detector 3, an entrance aperture 7, and a dispersive element 4. The dispersive element 4 may be an optical grating, for example, a reflective grating. In other embodiments the dispersive element 4 may be, for instance, a prism, special mirrors or transmission grating.

The light from the light source 2 is parallelized (collimated), for example, by means of a lens 10 and radiated through a sample 9. As a result of the collimation, a spatial selection of the light is enabled such that, for example, only light components from the spatial center of the light source 2 are radiated through the sample 9. One advantage that may result from the spatial selection of the light is that a selection of the light occurs from areas in the light source 2 that have a particularly low pulse-to-pulse fluctuation between individual flashes. To this end, additional pinhole diaphragms (e.g., which block out the light from peripheral regions of the light source), if applicable, or other optical devices known from prior art are used.

A lens 11 directs the light onto the entrance aperture 7 of the spectrometer 1 used for detection. As an alternative to the use of a single lens 11, a lens system, optical fiber, mirror system, or the like may be used.

The absorption spectrometer 1 shown includes the entrance aperture 7, a light limiter 5, and a first imaging system 8a for transmitting a beam bundle 6 from the entrance aperture 7 to the dispersive element 4. The spectrometer 1 includes a second imaging system 8b for transmitting the beam bundle 6 from the dispersive element 4 to the detector 3. In the beam path of the beam bundle 6 between dispersive element 4 and detector 3 conventional optical components may be integrated, such as a deflecting mirror or optical order-sorting filter for blocking out signals of higher orders of diffraction. The first and second imaging systems 8a, 8b are realized approximately above concave mirrors.

The light from the light source 2 is radiated through an entrance aperture 7 in the direction of the first imaging system 8a. The entrance aperture 7 is oriented along a z-axis. The light forms undle the beam b6, which is defined by a "left" light beam 2.1 and a "right" light beam 2.r. The light beams 2.1 and 2.r span an irradiation plane, which corresponds to an x-y plane (orthongonal to the z-axis) or is parallel thereto.

If the entrance aperture 7 is illuminated with a spectrum (e.g., broadband light source 2), lines in the form of the aperture are also obtained on a detector plane on the x-z-axis, spectrally separated, however.

The detector 3 may be a two-dimensional (2-D) detector. In such an embodiment, the detector 3 is a detector array, oriented on the x-y-axis. At the same time, the spectrometer 1 may be configured such that different signal amplitudes are on different z-coordinates of the detector 3, but have the same spectral characteristic. In one embodiment, the detector 3 is tilted with respect to the x-z-axis, for example, with respect to the x-axis.

To this end, the light limiter 5 is arranged between the light source 2 and the sample 9 and, thereby the detector 3 as well. The light limiter 5 limits the light of the light source 2 at an angle, e.g., approximately 90°, to the irradiation plane, i.e., the x-y plane. In such an embodiment, the light limiter 5 limits the light on the z-axis. There thus results a different amount of light on the z-axis, which ultimately is incident on the detector 3. The light limiter 5 may have an asymmetrical configuration. In such an embodiment, the light limiter 5 varies in width or thickness along, for example, its longest edge.

The entrance aperture 7 may be approximately an entrance slit, for example, an entrance slit 7. In at least one embodiment, the entrance aperture 7 is not symmetrical, for example, as light limiter 5. If the entrance aperture 7 is enlarged, more light is generally incident upon the detector 3, however, at the cost of the spectral resolution being lower. If the entrance aperture 7 is conical, as shown in FIG. 2, i.e., on the x-z plane, (white area transmits light), the image in FIG. 3 results on the x-z detector plane, with (as an example) three sharp frequency lines. The reference symbol "B" corresponds to blue light, reference symbol "G" to yellow light, and reference symbol "R" to red light. The sign of the z-axis is thereby mirrored, if applicable. The decisive factor is that only a very low signal amplitude is available in the areas on the z-plane with a small slit, but a greater signal is available in the areas with a large slit for the entrance aperture 7.

Figure 3:
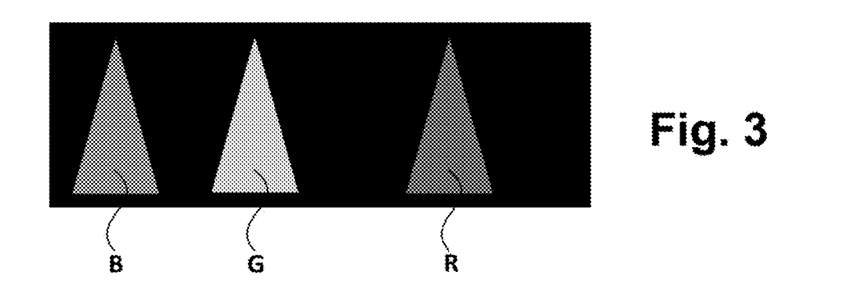
FIG. 3 shows an image resulting from the light limiter of FIG. 2 on a detector.

This effect can be taken advantage because signal information is taken from the detector plane from different z-coordinates, depending upon the intensity and wavelength. The intensity of the measurement signal is inferred for each wavelength from that line (z-coordinate) that is optimally controlled in detector 3. Accordingly, the dynamic range of the photodetector 3, e.g., a CCD, can be drastically increased. This mechanism may be used both for continuous light sources 2, such as halogen lamps, and for pulsed flash lamps.

Figure 4:
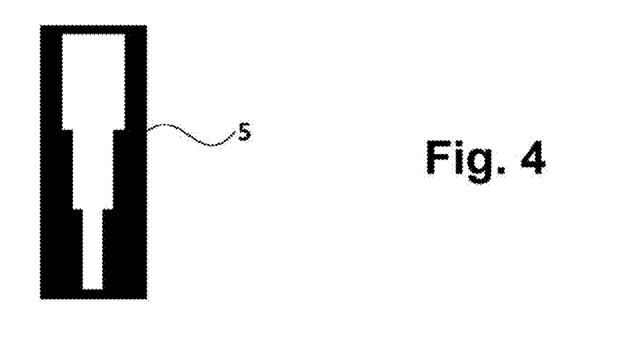
FIG. 4 shows another embodiment of a light limiter, according to the present disclosure.

FIG. 4 shows an embodiment of the light limiter 5 in which the light limiter has a step-like design.

Figure 5:
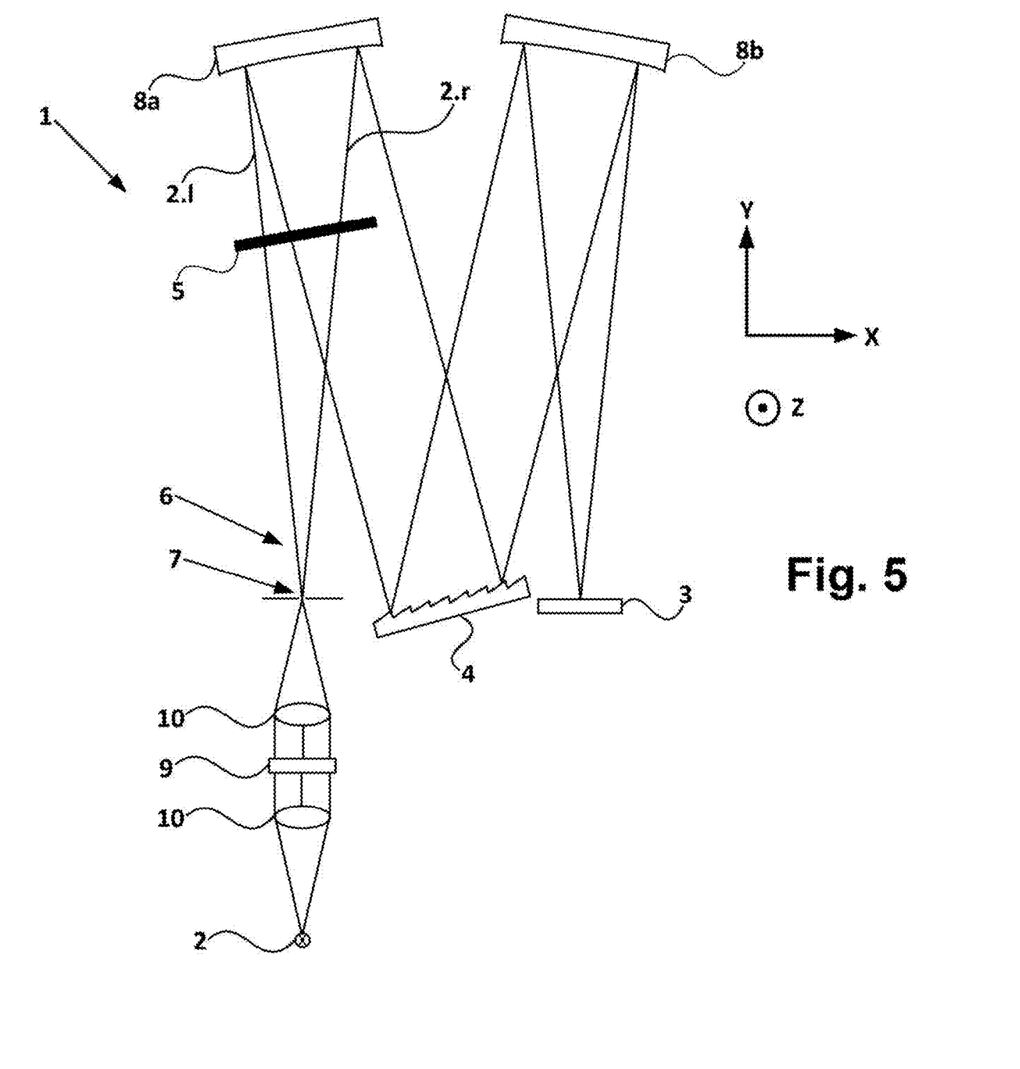
FIG. 5 shows an embodiment of an optical absorption spectrometer, according to the present disclosure.

In an embodiment, as shown in FIG. 5, the light limiter 5 is disposed on the z-axis in proximity of the first imaging system 8a, which may be a concave mirror. Shown in FIG. 5 is an embodiment in which the light limiter 5 is arranged at approximately ⅓ of the distance between entrance aperture 7 and the first imaging system 8a. The light limiter 5 is a spatial diaphragm, which causes a blurred shadow to be cast on the detector 3 along the z-axis.

Figure 6A:
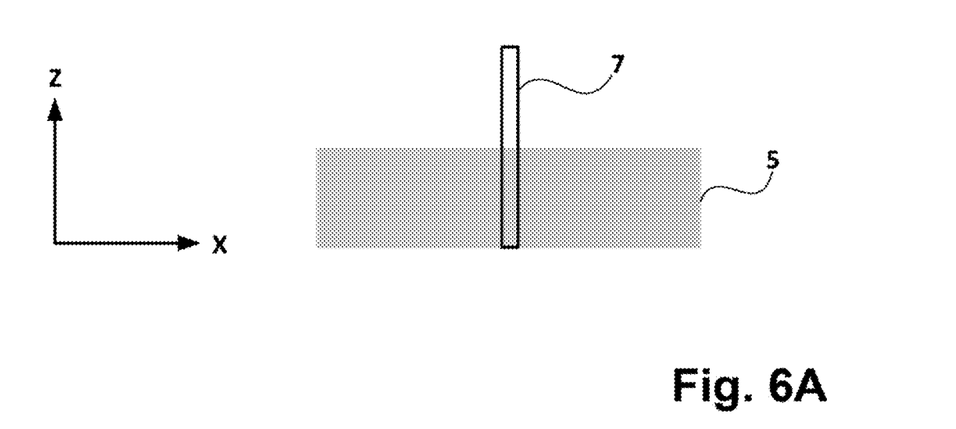
FIGS. 6A-6C show embodiments of a light limiter applicable to the spectrometer of FIG. 5.
Figure 6B:
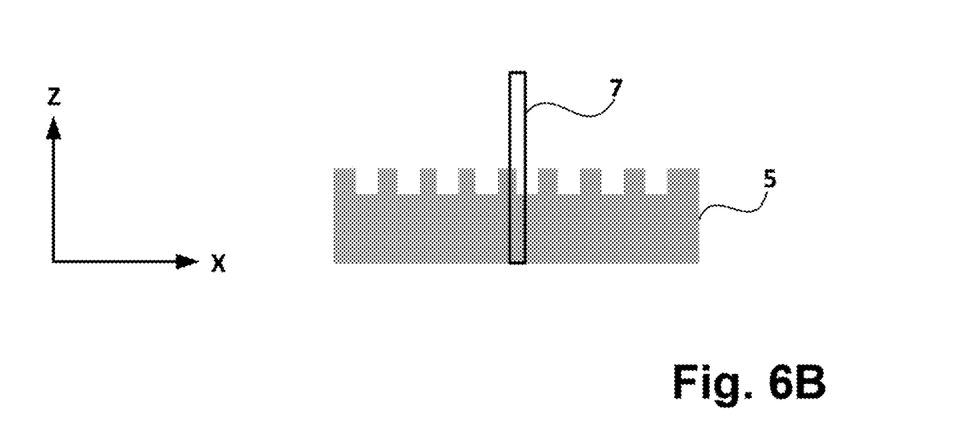
Figure 6C:
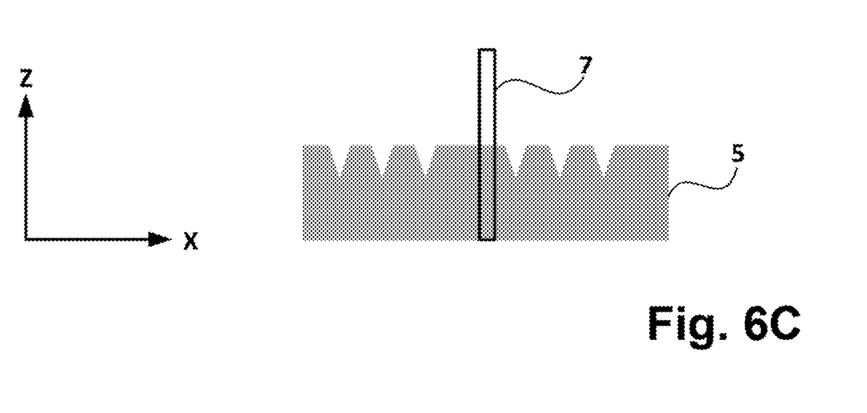

At the same time, the diaphragm, i.e., the light limiter 5, in relation to the entrance aperture 7 may have on the x-z plane a form as shown in FIGS. 6A, 6B and 6C, in which the form of the entrance aperture 7 on the x-z plane is outlined in black. A continuous gray filter may also be used here. The advantage of the structures shown in FIG. 6B and FIG. 6C is that, here, due to the blurred image, a continuous intensity curve in the z-direction may be achieved through a "black/white" diaphragm, as may be realized, for example, by a structured blackened plate. Such a blackened structure may be realized more simply and more cost-effectively as a continuous gray filter. In all embodiments, the light limiter 5 is structured such that a blurred shadow is generated on the x-y detector area and thereby a changing, varying amount of light on the detector 3 as a function of the z-coordinate.

The photodetector 3 may thus be controlled such that pixels of the detector 3 in the maximally-shaded area on the wavelength with maximum detector amplitude are not overexcited. For wavelengths with less signal, the measurand for pixels with a z-coordinate is determined, for which less shadow is effective. Advantageously, a read-out direction is selected such that the lines (z-axis) with a low signal level in the detector are read out first, and the lines with a high signal level thereafter.

Figure 7:
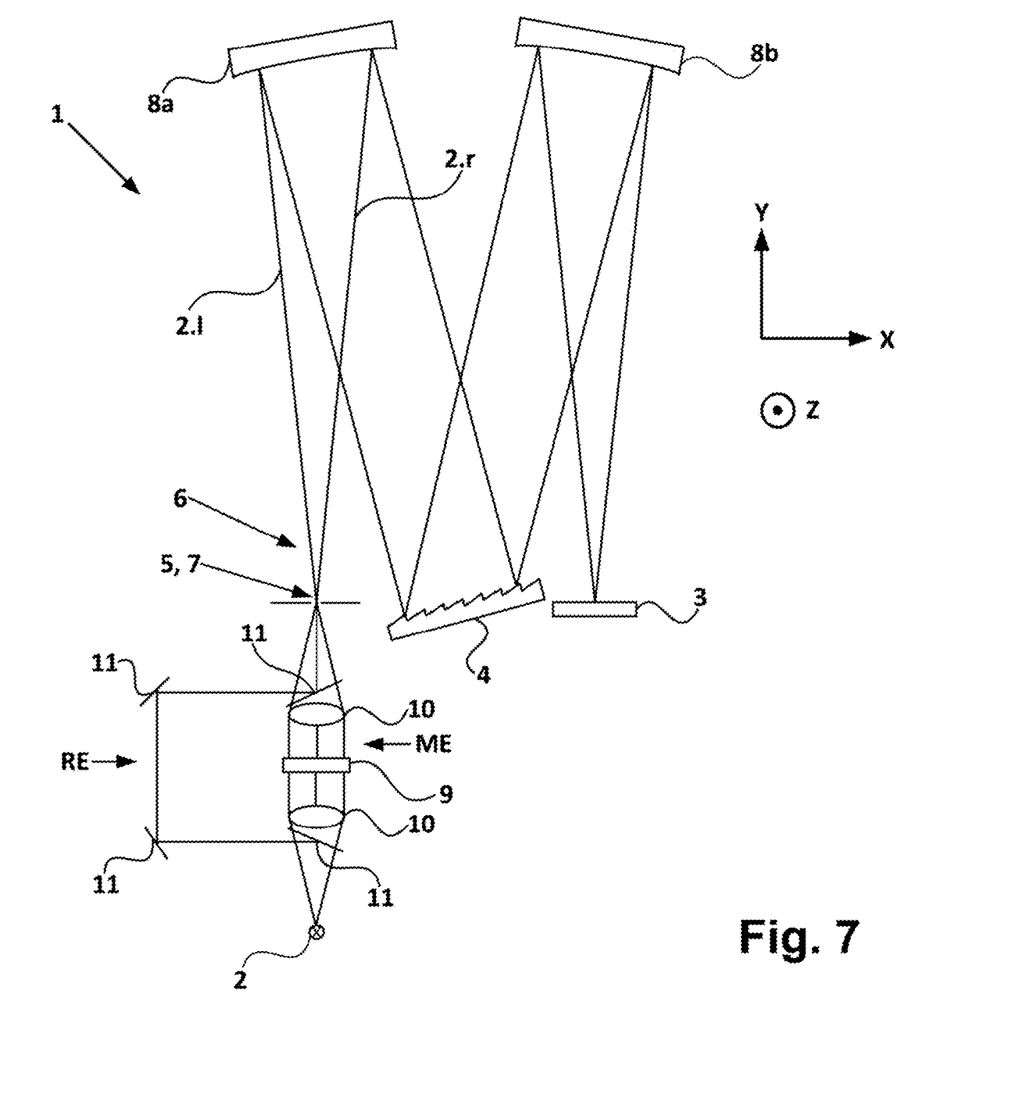
FIG. 7 shows an embodiment of an absorption spectrometer with reference path.

FIG. 7 shows an embodiment of the absorption spectrometer 1 with a measurement path ME and a reference path RE of the light. The measurement path ME is the one described herein in relation to, for example, FIG. 1. The reference path RE is a light path that is not directed through the sample 9. Instead, the reference path RE is directed around and past the sample 9. Downstream of the sample 9, the path is directed through the entrance aperture 7. The descriptions relating to FIG. 1 and FIG. 5 are applicable. If applicable, a different embodiment of the light limiter 5 results; see, in this regard, below and FIG. 9.

In the embodiment shown in FIG. 7, the spectrometer 1 includes several deflectors 11 disposed in the reference path RE, which form a deflector system. In such an embodiment, light from the light source 2 is directed around the sample 9 with several deflectors 11, which may be, for instance, mirrors or semi-transparent mirrors. In an embodiment, the deflectors 11 that are arranged closest to the light source 2 and to the entrance aperture 7 may each be semi-transparent mirrors. In one embodiment, the deflectors 11 that are arranged closest to the light source 2 and to the entrance aperture 7 are configured as tilting mirrors. Depending upon whether the measuring path ME or the reference path RE is to be measured, the each tilting mirror, i.e., the deflectors 11, is shifted accordingly. Each tilting mirror may have either a monostable or bistable design. Each tilting mirror may be controlled by means of an electric motor or magnetically. An advantage of the embodiment having semi-transparent mirrors is that a reference measurement (simultaneously with a sample measurement) may be performed continuously, such that pulse-to-pulse fluctuations of a pulse-controlled light source 2 may, for instance, also be compensated for.

Figure 8:
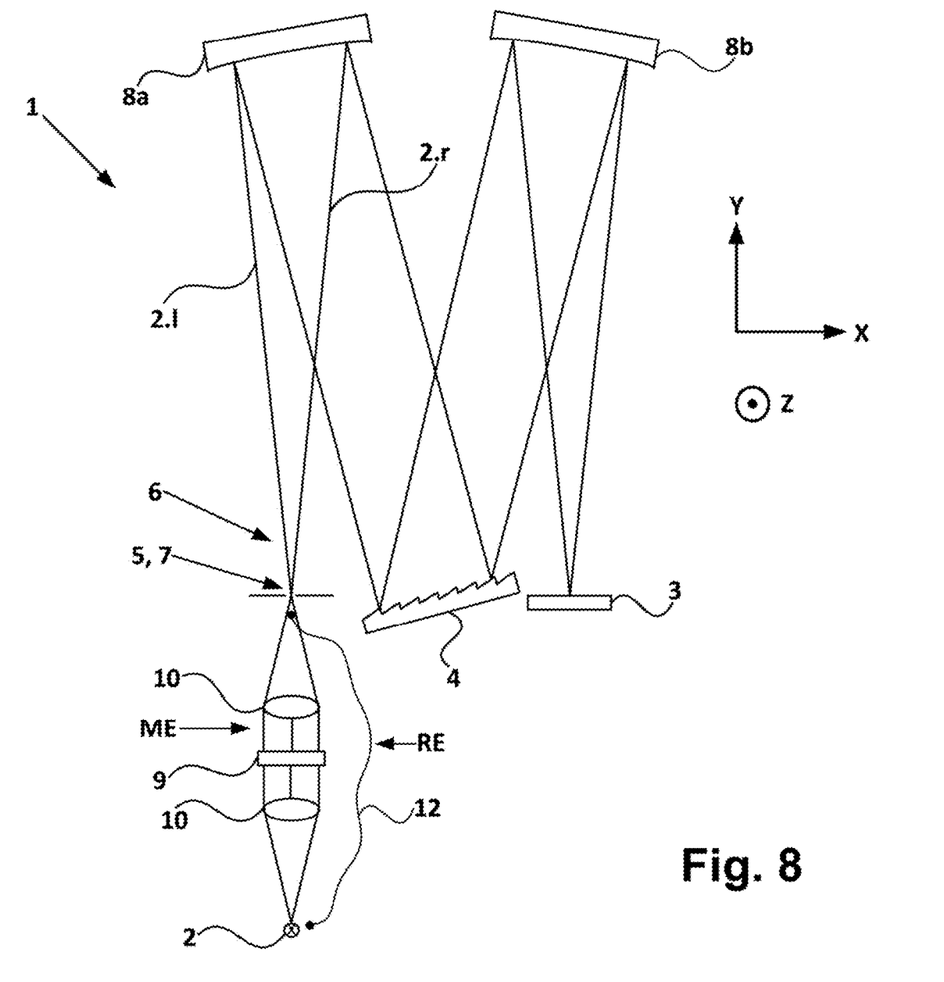
FIG. 8 shows another embodiment of the absorption spectrometer with reference path.

In the embodiment shown in FIG. 8, the spectrometer 1 includes a fiber optic cable 12 arranged in the reference path RE fiber optic cable 12 receives light from the light source 2 and transmits the light around the sample 9. Downstream of the sample 9, the light from the fiber optic cable 12 is coupled again, i.e., directed through the entrance aperture 7. If applicable, a beam splitter, semi-transparent mirror, or a tilting mirror may be arranged downstream of the light source 2 to switch between the reference path RE and the measuring path ME.

Figure 9:
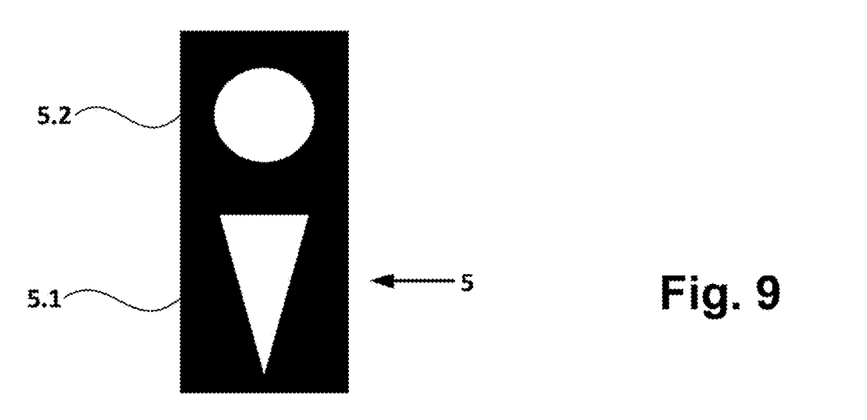
FIG. 9 shows an embodiment of the light limiter applicable to the embodiments of FIGS. 7 and 8.
Figure 10:
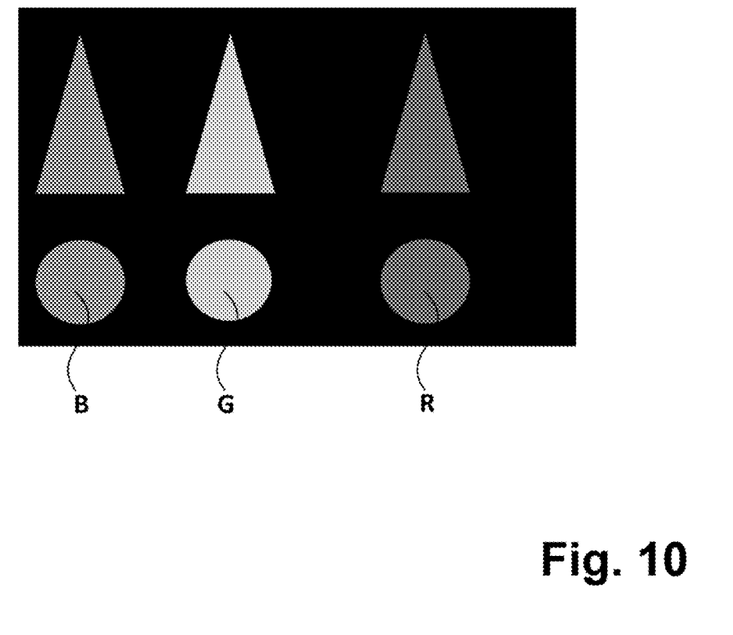
FIG. 10 shows an image resulting from the light limiter of FIG. 9 on a detector.

FIG. 9 shows an embodiment of the light limiter 5, which is suitable, in particular, for the spectrometers 1 of FIGS. 7 and 8. In such an embodiment, the light limiter 5 includes two zones 5.1 and 5.2. The first zone 5.1 corresponds essentially to the embodiment of FIG. 2 or FIG. 4. The second zone 5.2 is additional to the first zone 5.1. The second zone 5.2 may have the form of a circle as shown; however, other forms such as square, rectangle, etc., are possible. A triangular or stepped structure, as in the first zone 5.1, is also possible for the second zone 5.2. The light limiter 5 with the two zones 5.1, 5.2 is arranged such that light from the reference path RE is always radiated through the second zone 5.2, and the first zone 5.1 has light radiated along the measuring path ME. In such an embodiment, the image in FIG. 10 results on the detector 3. As shown, the light from the reference path RE arrives at the same place on the detector 3 and is, in particular, spatially separated from the light from the measuring path ME. When a two-dimensional image is received on the detector 3, the intensity of the reference path RE and of the measuring path ME can thus be detected simultaneously for each light pulse in each case. Pulse-to-pulse fluctuations in the intensity of the light source may thus be compensated for mathematically.

The invention claimed is:

1. A spectrometric measuring device for a measurement point of a process automation system, the device comprising:
   a broadband light source configured to emit a beam of light along a light path through a sample to be measured and through an entrance aperture, wherein the beam of the light defines an irradiation plane in an X-Y plane;
   a spatial filter disposed along the light path, the spatial filter configured to limit the beam an amount that varies along the Z-axis;
   a prism, mirror or grating configured to separate the light into its wavelengths; and
   a detector adapted to receive the light separated into its wavelengths by the prism, mirror or grating, wherein the detector is a two-dimensional detector,
   wherein the light source emits the beam of light through the sample, the entrance aperture, the spatial filter and the prism, mirror or grating, and the light is subsequently incident upon the detector, wherein the spatial filter is structured such that a blurred shadow is generated on the X-Y detector area and thereby a varying amount of light on the detector as a function of the Z-coordinate.

2. The spectrometric measuring device of claim 1, wherein the entrance aperture includes the spatial filter.

3. The spectrometric measuring device of claim 2, wherein the spatial filter is conical.

4. The spectrometric measuring device of claim 2, wherein the spatial filter is step-like.

5. The spectrometric measuring device of claim 1, wherein the spatial filter is disposed between light source and the prism, mirror or grating.

6. The spectrometric measuring device of claim 1, wherein the angle to the irradiation plane is approximately 90°.

7. The spectrometric measuring device of claim 1, further comprising at least one imaging system for directing the light from the light source in a direction of the prism, mirror or grating and/or from the prism, mirror or grating in a direction of the detector.

8. The spectrometric measuring device of claim 7, wherein the at least one imaging system includes a concave mirror.

9. The spectrometric measuring device of claim 7, wherein the spatial filter is disposed between the light source and an imaging system, and wherein the imaging system directs the light from the light source to the prism, mirror or grating.

10. The spectrometric measuring device of claim 1, wherein the spatial filter is a diaphragm.

11. The spectrometric measuring device of claim 10, wherein the diaphragm has a comb-like form.

12. The spectrometric measuring device of claim 1, wherein the spatial filter is configured such that the light at the angle to the irradiation plane is attenuated such that, at the angle, a different amount of light continuously results.

13. The spectrometric measuring device of claim 1, wherein the light path includes a measurement path and a reference path, wherein separate portions light from the light source are directed via the measurement path and the reference path, wherein the reference path does not pass through the sample.

14. The spectrometric measuring device of claim 13, wherein the light of the reference path, which passes through the spatial filter at the angle to the irradiation plane is spatially separated from the light of the measurement path on the detector.

15. The spectrometric measuring device of claim 13, wherein the entrance aperture includes the spatial filter, and the light of the reference path is coupled to the spatial filter via an optical fiber.

16. The spectrometric measuring device of claim 13, wherein, to compensate for light intensity fluctuations of the light source, the spatially separately light intensities of the reference path at the detector are linked via a mathematical process with the light intensities of the measurement path.

17. The spectrometric measuring device of claim 16, wherein the mathematical process linking the light intensities of the reference path and the measurement path is a division.

18. The spectrometric measuring device of claim 1, further comprising collimating optics configured to image light only from a spatially limited area of the light source onto the detector.

19. The spectrometric measuring device of claim 18, wherein the collimating optics are configured to image light from a center of the light source onto the detector.

* * * * *